Figure 1:
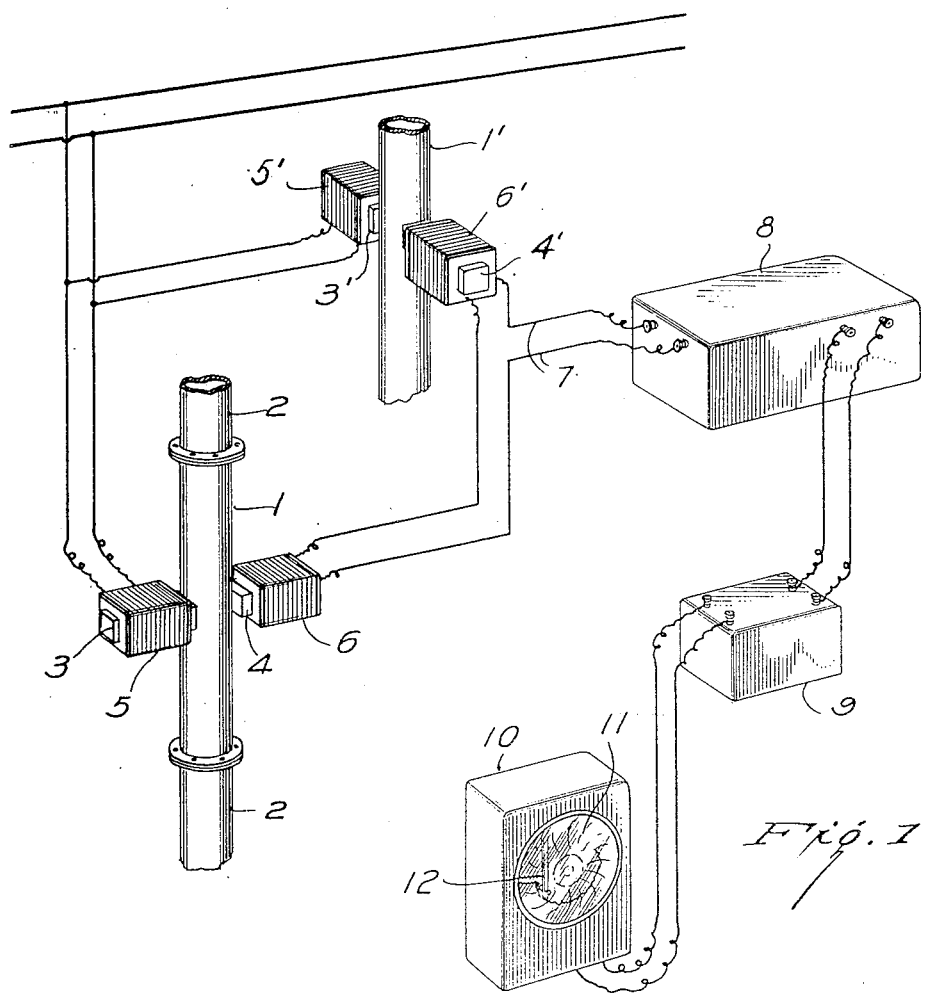

Aug. 6, 1946.  S. I. GALE ET AL  2,405,137

METHOD AND APPARATUS FOR ANALYZING IRON SLUDGE

Filed Oct. 12, 1942

INVENTORS
SHIRLEY I. GALE,
JAMES M. MORAN,
WINFIELD B. HEINZ,
BY
Emer W. Harmon  ATTORNEY Patented Aug. 6, 1946

2,405,137

UNITED STATES PATENT OFFICE 2,405,137

METHOD AND APPARATUS FOR ANALYZING IRON SLUDGE

Shirley Irving Gale, Plainfield, James M. Moran, South Plainfield, and Winfield B. Heinz, Bound Brook, N. J., assignors to American Cyanamid Company, New York, N. Y., a corporation of Maine Application October 12, 1942, Serial No. 461,712

3 Claims. (Cl. 23—230)

This invention relates to the control of industrial processes which involve a chemical reduction step using a magnetizable metal as a reducing agent. More particularly, the invention relates to an improved method and apparatus for controlling the reduction of nitro compounds such as nitrobenzene to the corresponding amino compounds such as aniline.

Process steps in which one compound is subjected to treatment with a magnetizable, metallic, reducing agent to derive a second compound are found in the manufacture of many industrially important chemicals. A good example of such a procedure is found in the manufacture of such amines as aniline, naphthylamine and their homologs or analogs. In the usual method of producing these materials, a nitro compound is reduced with a powdered metal to yield the corresponding amino compound. Aniline, for example, is produced by reducing nitrobenzene, usually with powdered iron.

For the purposes of the present specification and claims, the manufacture of aniline will therefore be used as illustrative of the problems which the present invention is intended to solve as well as the nature of the invention. However, neither the process nor the apparatus is necessarily limited to the production of aniline. Other applications will be readily perceived from the illustrative disclosure.

In the commercial manufacture of aniline, the reduction of the nitro compound, in this instance nitrobenzene, is generally carried out in large autoclaves, which often may have a capacity of several tons or more of the reactant mixture. Because of the corrosive and the disagreeable physiological properties of the materials used, these reaction vessels are necessarily closed. Sight-glasses, and the like, which may be easily fractured and allow the escape of the materials are also undesirable for the same reason. Further, because of the nature of the reaction mixture, sight glasses, if installed, would be of little practical value since the necessary information can not be readily determined by visual inspection. The operator, therefore, has difficulty in making certain that any particular reaction vessel has been properly charged, properly emptied or properly washed.

One illustration of the operator's difficulty is met with after the reaction is complete. At that time the reaction vessel charge comprises a layer of substantially pure aniline and a layer of emulsion sludge comprising iron, iron oxides, water and an appreciable amount of aniline. One procedure of isolating the aniline would be to send the whole charge to a still, steam-strip the charge, allow the distillate to separate into layers and decant the aniline layer. However, in addition to the direct expense of distilling such a large volume, the solubility of aniline in water, though limited, is great enough to result in an appreciable loss in the water layer. In order to minimize both the distilling cost and the aniline loss, it is desirable to distill as little of the charge as possible. Practically, it is much faster and more economical to decant as much aniline as possible directly from the autoclave. The decantable aniline is therefore, removed and sent either to storage tanks, or to further processing.

The operator naturally wishes to decant the greatest possible amount of aniline yet does not want to drag any sludge into the aniline storage since that might necessitate reprocessing the entire stock. The absence of a suitable indicator makes this very difficult to do. The operator must stop the decantation at a point which experience has shown will prevent sludge being drawn into the aniline storage. As a result, considerable potentially decantable aniline is left in the kettle to provide a margin of safety. There is, therefore, a need for a good method and means for regulating the decantation to the greatest advantage.

In addition to the separated aniline left after the first decantation the sludge or emulsion contains an appreciable quantity of aniline. A part of this aniline will gradually separate from the sludge. Yet to allow a greater separating time in the autoclave would tie-up the apparatus for a period of time not commensurate with the recovery. Nor would the operator normally attempt any further decantation, even after the necessary settling period, because of the same necessity for being certain that no sludge is drawn off in the decanting step. There is also an appreciable quantity of aniline in the emulsion which will not separate out, at least within any practical settling time.

As was pointed out, it is undesirable to distill any aniline which may be otherwise isolated. One procedure which may be followed in order to recover the residual aniline without unnecessary distillation is to wash it out. Wash water is added to the autoclave at a rate fast enough to carry out the aniline and the oxidized iron. Because of its relatively high specific gravity the unreacted iron settles and is left in the autoclave. The wash water, together with the aniline, iron oxide and the like removed by it, is sent to a settling tank where a major portion of the separable aniline rises to the surface and is decanted. At the same time the iron oxide settles. This procedure may be varied by first decanting as much aniline as possible without too great a sludge content into one settling tank and then washing the remainder away from the iron into a second tank. In order to prevent losses of aniline in the wash water it is usually reused. The solids, including the iron oxide, which collect in the settling tanks can be freed from the remainder of their aniline by further washing and/or steam-stripping before being discarded.

These washing steps also add to the operational difficulties. It is necessary to continue the washing until substantially all the aniline has been removed from the autoclaves and the unreacted iron therein but any further washing is not only unnecessary but actually wasteful. Unnecessary washing not only creates a direct cost but increases the overhead by immobilizing equipment which could otherwise be productively employed. There is, therefore a definite need for a reliable method of and means for ascertaining the nature of the fluids moved during the various washing operations if washing is to be done with the optimum efficiency.

As illustrative of this fact, it was found to be common practice in some plants to allow a period of one hour for washing the autoclave in order to be on the safe side with all charges. Investigation developed the fact that in most cycles the residual iron was free from aniline after about ten minutes of washing and in most of the others after not over twenty minutes. This means that an average of about 45 minutes could be cut from each cycle. On a six hour cycle this meant an added production of one cycle every 48 hours. This is particularly important from an economic standpoint in the case of materials such as aniline in which the unit profit is very small and volume is large. Small changes in the volume produced with a fixed overhead may make the difference between an operation which is economically desirable and one which is not.

These operational difficulties represent only a part of those facing the operator in carrying out the manufacture of aniline, and aniline is merely intended as illustrative of many reduction procedures. It is readily apparent, therefore, that an effective method and means enabling the operator to ascertain the content of fluids at various points in the process in order to better control the flow of materials is desirable.

Conventional practice accomplishes this by sampling and laboratory testing. This method, while sure, is not wholly effective since it is much too slow for efficient operation. For best results, the operator requires a method and/or means of making certain of the nature of the fluid at the time he is moving it. It is therefore the object of the present invention to provide a method and apparatus for this purpose which will not only be certain and effective but will also be simple and instantaneous.

In general this is accomplished by taking advantage of the fact that in many reactions such as the reduction of nitrobenzene, the metallic iron is transformed to a magnetizable oxide such as black iron oxide. The permeability of the metallic material and/or the magnetizable oxide, which is present in the fluids to be handled, is made to serve as an indicator. In general this is done by setting up an electromagnetic circuit and measuring the effect upon this circuit of the magnetizable material carried by the flowing liquid. This measure is then used to provide the operator with the information he requires.

From the above discussion it will be noted that in most cases where the operator is not certain of his materials, an indication of either the presence or absence of magnetizable material in the fluids is adequate to overcome the operator's uncertainty. In the other cases, a measure of the magnetizable material content is all that is necessary. For example, in most industrial aniline manufacture, one pump serves to effect the movement of materials for a battery of autoclaves and one or more settling tanks. If the operator is decanting aniline from a finished reaction, the aniline may be pumped to one point until indicator shows a trace of magnetizable material, in that case iron oxide, in the effluent. The flow may then be diverted to another point, as for example the settling tanks.

Similarly, the washing need only be carried out until the effluent shows the necessary minimum magnetizable material content. For example, in washing the reacted residue after decantation, the magnetizable iron oxide is washed out along with the aniline and any metallic iron is left behind. Therefore the operator need only continue the washing operations as long as the indicator shows that the effluent contains magnetizable iron oxide. When iron oxide is no longer present there is substantially no aniline in the effluent. Obviously a very violent washing action will carry some iron into the effluent, however the permeability of iron differs from that of iron oxide and its presence would be noticeable because of the sudden change in the indicator reading. Various other applications will be readily apparent to a skilled operator.

Figure 2:
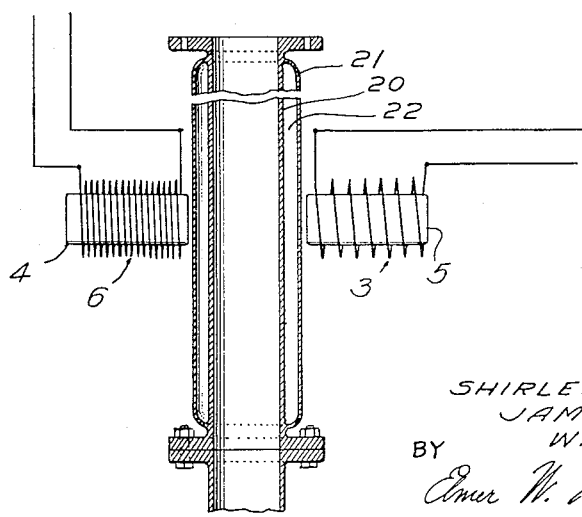

The invention will be more fully set forth in connection with the accompanying figures in which:

Figure 1 represents a schematic arrangement of one type of magnetic circuit which is suitable for use in the present invention; and Figure 2 represents a cross section of one type of cell adapted to the measurement of the effect of magnetizable material in the flowing fluid.

In Figure 1, I represents a cell of non-magnetic material, replacing a segment of the pipe 2 which connects a pump to two headers. Since the pump and headers form no part of the present invention they have not been shown. These headers are properly valved to enable the pump to be used in moving liquid from and to various pieces of apparatus such as the settling tanks, stills, storage tanks and reaction kettles. A magnetic field is set up across the cell I between the cores 3 and 4 by impressing an alternating current from some suitable source on a coil 5 which is wound on core 3. A responsive current is induced in coil 6 which is wound on core 4.

A substantially identical including cell I', cores 3' and 4' and coils 5' and 6' is also provided. However, the windings on one of the coils of this second circuit are reversed from those of the circuit of cell I. Thus, by connecting the leads from coils 6 and 6' and matching the two circuits, no current will flow in the common leads 7. The two circuits are matched by constructing substantially duplicated apparatus except for the reversed windings. If desirable, a suitable variable resistance or reactance, not shown, may be included in one or both circuits to accomplish an exact balance.

Once the two circuits are in balance, as pointed out, no current will tend to flow in the common leads 7. When the circuit is then put into use, fluid will pass through cell I. Cell I', however, will contain only air or a static amount of liquid. Nevertheless, so long as the liquid flowing through cell I has no effect on the magnetic field, no current will tend to flow in leads 7. For example, the two circuits may be balanced with air in cell I' and water flowing through cell I. Or cell I' may be filled with water and water flowed through cell 1 without causing a current flow. If then the water or other fluid in cell 1 is carrying a material which affects the magnetic field across that cell, the two circuits become unbalanced and a current will flow in leads 7.

This current is passed into an amplifier 8 and the amplified current is rectified by rectifier 9 and its amplitude recorded by the recording meter 10. Amplifier 8 and rectifier 9 may be any one of many conventional types which are commercially available and their electrical circuits form no part of the present invention. The recording meter 10 diagrammatically represented in Figure 1 may also be any one of several conventional and commercially available types.

Recording meter 10 has incorporated therein a clockwork mechanism of some type which rotates the disc 11. Annular displacement of disc 11 therefore provides a measure of elapsed time, the disc being divided into appropriate units. Meter 10 also has a recording pen 12 of conventional design which traces a continuous record on disc 11. Radial displacement of pen 12 is governed by the amplitude of the amplified and rectified current from rectifier 9. Therefore the radial displacement of pen 12 is proportional to the disturbance caused by the magnetizable material passing through cell 1.

Radial distance on disc 11 may be calibrated to measure any desired function of this disturbance of the magnetic field. For example, in the manufacture of aniline, the greater the amount of iron oxide carried by the fluid passing through cell 1, the greater the disturbance of the field and the greater the resultant radial displacement of pen 12. Accordingly, radial displacement of pen 12 may be calibrated to represent the amount of magnetizable material in the fluid. Or if desired the unit may be calibrated as a ratio, such as the ratio of iron to iron oxide or the per cent of conversion. Other calibrations can be made, depending on the use to which the apparatus is put. In any case, after calibration of units, pen 12 will trace a line on disc 11 which will indicate the desired reading as it varies with time.

Several precautions should be observed for the best operation of the apparatus. Obviously for best results, the walls of cell 1 should be of some material which is non-magnetizable or which does not affect the magnetic field. At the same time it should not be a material which will be corroded appreciably by the material which must pass through it. Nor if the materials have disagreeable physiological effects, as in the case of aniline, should it be one which is easily broken. Good results were obtained in developing the present invention by making use of brass cells. Other suitable materials include porcelain, glass lined non-ferrous metals, hard rubber, Bakelite and the like.

In use another variable is temporarily introduced into the circuit by changes in temperature. Again, using the manufacture of aniline as representative; the cell 1' may have been filled with air and water have been flowing through the cell 1 when the circuits were originally matched. The cell 1' is usually dissociated from the rest of the apparatus and will remain substantially at room temperature. However, the liquids passing through cell 1 are usually at a temperature considerably higher. Yet liquid is not at all times being passed through cell 1 and the temperature of cell 1 may therefore vary from substantially room temperature to a temperature which is considerably higher. Appreciable changes in cell temperature will also cause changes in the temperature of cores 3 and 4. These temperature changes in the metallic parts alter the permeability and therefore introduce an error in the indicator. An even more important error is introduced by the changes in resistance which occur in the metal parts as the temperature varies. These resistance changes vary the flow of eddy currents in the metal parts which in turn vary the reaction with the magnetic flux and produce changes in indicator readings.

To compensate for these errors it has been found well to maintain the temperature of the cell 1 approximately constant. One means for accomplishing this is shown in Figure 2 in which the walls 20 of the cell are enclosed by a jacket 21 leaving an annular space 22 through which steam or some other readily available source of heat may be constantly circulated. While this may not provide an absolutely uniform temperature in cell 1 it will be found to produce a much more uniform reading than is obtainable from a cell which is unjacketed.

Another expedient is to adjust the coils to a size which, in accordance with the current supplied to them, will heat the cores 3 and 3' and the metallic parts adjacent to them to a temperature about that of the fluids which will normally be passed through the cell 1. More precise control of temperature such as might be obtained by using an electrical resistance and a thermostat may not be employed since to do so would introduce stray magnetic influences which would cause greater fluctuations than those caused by temperature changes alone.

Still another method of compensating for the errors introduced by temperature fluctuations is to take advantage of the fact that the principal error is introduced by the changes in eddy currents. By making the cells, such as cell 1 of Figure 1 of a high resistance metal the eddy current flow can be reduced to a minimum and thereby lessen the error introduced by variations therein. For example, such high-resistance metals as Nichrome alloys or many of the stainless steels are suitable for this purpose.

Various substitutions in the overall circuit may be made without departing from the scope of the present invention. For example, the source which supplies alternating current to coils 5 and 5' may not be consistently uniform. In such a case it is frequently desirable to insert a voltage control in the line. Again, instead of using a recording meter 10 in the circuit, an automatic control device may be employed so that suitable fluctuations in the amplified, rectified current will operate some other part of the apparatus without the attention of the operator.

Although excellent results were obtained using the hook up of Figure 1, the arrangement of the coils with respect to the cell may also be considerably varied without departing from the scope of the present invention. For example, instead of using separate cores 3, 3', 4, 4', the coils may be wound directly on the corresponding cells 1, 1'. In so doing, the coils may be wound on the same or adjacent segments of the cell.

As pointed out, an additional element may be introduced into one or the other of the circuits in order to effect a perfect balance. It is also possible to use a totally different type of circuit in each branch without necessarily departing from the scope of the invention. Instead of using a secondary set of coils and a blank cell, some other means may be used to provide the opposing potential. A suitable potential might be obtained from an external power supply operating through a suitable resistance or reactance. The use of duplicate circuits, however, does give excellent results since the circuits are easily balanced.

In operation the apparatus of the present invention is certain and substantially instantaneous. Its applicability for a number of different purposes appears to be obvious. For example, in decanting aniline it is only necessary to open the line from the autoclave to the pump, start the pump and send the decanted aniline to any designated point. Instead of continuing to decant for only that period of time which experience has shown to be safe, but which seldom permitted the removal of all the potentially decantable aniline, decantation may be continued until the first trace of sludge enters cell 1. The magnetizable material in the sludge will upset the magnetic balance, cause a current to flow in leads 7 and instantaneously thereafter cause a displacement of the indicator or recording pin. Observing this change the operator may shift the exit line to the settling tank before any sludge is carried into the aniline receiver. Similarly, in controlling washing operations it is only necessary to continue washing as long as there is any magnetizable material in the effluent to upset the electrical balance and cause a displacement of the indicator.

By taking advantage of the effect of metals in the fluids which cause variations in the magnetic field the apparatus may be readily adapted to the performance of other functions. As has been previously pointed out, the apparatus is readily adapted to serve as a motivator for operating various automatic controls. For example, the current may be amplified, if necessary, and used to motivate electrically-controlled valves, a number of which are commercially available. Again, by continuously circulating a portion of a reacting mixture which originally contained a known amount of magnetizable metal through the cell, the progress of the reaction can be recorded and changes in the current flow used to regulate the process by regulating temperature, pressure or the like.

We claim:

1. In a manufacturing operation involving a chemical reduction in which at least a portion of a magetizable metallic reducing agent is transformed to a magnetizable metal oxide and involving the separation of fluid fractions of different magnetizable material content, the improved method of regulating the separatory processes which comprises: establishing two alternating electro-magnetic fields each adapted to induce a potential in a coil inductively-coupled therewith, said potentials being substantially small; said coils being connected with opposed polarity to common leads; balancing the opposed circuits so that no current flows in said common leads; continuously passing at least a representative portion of the fluid fraction being separated from the remaining fluid fractions through only one of said alternating electro-magnetic fields, whereby the presence of magetizable material in said portion will cause a current proportional to the magnetizable material content of said fluid to flow into said common leads; measuring the changes in said current flow and directing the flow of fluids to be separated to different portions of the apparatus in accordance with its magnetizable material content as indicated by said changes in the current flow.

2. An apparatus for indicating changes in the magnetic properties of a flowing stream of materials which comprises conduit means, at least a section of which is of a non-magnetizable material, for conducting at least a representative portion of said stream therethrough; a hollow jacket, also of non-magnetizable material, surrounding said section and adapted to have a heat-exchange fluid passed therethrough; a first means adjacent one side of said section for creating an alternating electro-magnetic field in which said section is located; a first electrical coil, inductively coupled in said field and located on the opposite side of said section from said field-creating means; a means in equivalency of said non-magnetizable section, adapted to serve as a comparison section but not adapted to contain such material; a second means, adjacent said equivalent means for creating a second alternating electro-magnetic field of substantially the same intensity as the first and in which second field said equivalent means is located; a second electrical coil inductively coupled in said second field and located on the opposite side of said equivalent means from said second field-creating means; common lead means connecting said first and said second coil with opposed polarity, said coils being normally balanced whereby no current will flow in said common leads; and means connected in said common leads to indicate changes in potential therein.

3. An apparatus for indicating changes in the magnetic properties of a flowing stream of material which comprises: conduit means, at least a section of which is of a non-magnetizable material, for conducting at least a representative portion of said stream therethrough; means for maintaining said non-magnetic section of said conduit at a substantially uniform temperature independently of the temperature of the fluid flowing therethrough; a first means adjacent one side of said non-magnetizable section for creating an alternating electro-magnetic field in which said section is located; a first electrical coil, inductively coupled in said field and located on the opposite side of said section from said field creating means; a means in equivalency of said non-magnetizable section adapted to serve as a comparison section but not adapted to contain such material; a second means adjacent one side of said equivalent means for creating a second alternating electro-magnetic field of substantially the same intensity as the first and in which second field said equivalent means is located; a second electrical coil, inductively coupled in said second field and located on the opposite side of said equivalent means from said second field producing means; common lead means connecting said first and said second coil with opposed polarity, said coils being normally balanced whereby no current will flow in said common leads; and means connected in said common leads to indicate changes in potential therein.

SHIRLEY IRVING GALE.
JAMES M. MORAN.
WINFIELD B. HEINZ.

Certificate of Correction

Patent No. 2,405,137.  August 6, 1946.

SHIRLEY IRVING GALE ET AL.

It is hereby certified that error appears in the printed specification of the above numbered patent requiring correction as follows: Column 4, line 52, after "identical" insert the word *circuit*; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*